BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 19, 1968

856 O.G. 670

T856,031

677,016

1 - AMINO - 2 - ARYLSULFONYLOXYPHENOXY-4 - (HYDROXY, AMINO AND SUBSTITUTED AMINO)-ANTHRAQUINONES

James M. Straley and Ralph R. Giles, both % Tennessee Eastman Company, P.O. Box 511, Kingsport, Tenn. 37662

Filed Oct. 23, 1967. Published Nov. 19, 1968

Class 260—372

No Drawing. 14 Pages Specification

Anthraquinone compounds prepared by reacting an arylsulfonyl halide and a 1-amino-4-amido (or -hydroxy)-2-hydroxyphenoxyanthraquinone are useful as dyes for hydrophobic textile materials.